US010845509B2

(12) United States Patent
Ludemann et al.

(10) Patent No.: US 10,845,509 B2
(45) Date of Patent: Nov. 24, 2020

(54) LOW SPARKLE MATTE COATS AND METHODS OF MAKING

(71) Applicant: 3M INNOVATIVE PROPERTIES COMPANY, St. Paul, MN (US)

(72) Inventors: Thomas J. Ludemann, Highland Village, TX (US); David T. Ask, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/911,483

(22) Filed: Jun. 25, 2020

(65) Prior Publication Data

US 2020/0326458 A1 Oct. 15, 2020

Related U.S. Application Data

(63) Continuation of application No. 15/760,180, filed as application No. PCT/US2016/051943 on Sep. 15, 2016, now Pat. No. 10,732,331.

(60) Provisional application No. 62/218,963, filed on Sep. 15, 2015.

(51) Int. Cl.
*G02B 5/02* (2006.01)
*G02B 1/111* (2015.01)
*F21V 8/00* (2006.01)

(52) U.S. Cl.
CPC ............ *G02B 5/0242* (2013.01); *G02B 1/111* (2013.01); *G02B 5/0226* (2013.01); *G02B 6/0051* (2013.01)

(58) Field of Classification Search
CPC ...... G02B 5/02; G02B 5/0242; G02B 5/0236; G02B 5/0226

USPC .......................................................... 359/599
See application file for complete search history.

(56) References Cited

U.S. PATENT DOCUMENTS

| | | |
|---|---|---|
| 5,104,929 A | 4/1992 | Bilkadi |
| 5,770,306 A | 6/1998 | Suzuki et al. |
| 5,919,555 A | 7/1999 | Yasuda et al. |
| 6,074,741 A | 6/2000 | Murata et al. |
| 6,214,111 B1 | 4/2001 | Yapel et al. |
| 6,217,176 B1 | 4/2001 | MacKawa |
| 6,376,060 B1 | 4/2002 | Yoshihara et al. |
| 6,572,961 B1 | 6/2003 | Koyama et al. |
| 6,576,296 B1 | 6/2003 | Yapel et al. |
| 6,852,376 B2 | 2/2005 | Chien et al. |

(Continued)

FOREIGN PATENT DOCUMENTS

| | | |
|---|---|---|
| JP | 2009-244509 | 10/2009 |
| JP | 2010-152080 A | 7/2010 |

(Continued)

OTHER PUBLICATIONS

International Search Report for PCT International Application No. PCT/US2016/051943, dated Jan. 2, 2017, 4 pages.

*Primary Examiner* — William C. Dowling

(57) ABSTRACT

A matte coat having a first major surface, the matte coat comprising a first layer defining the first major face of the matte coat and comprising a polymeric matrix and a plurality of forming bodies entrained therein, wherein index of refraction of the forming bodies is similar to that of the polymeric matrix and the first major surface has a plurality of protuberances corresponding to forming bodies entrained within. Also, optical assemblies comprising such matte coats and methods for making such matte coats.

10 Claims, 6 Drawing Sheets

(56) References Cited

U.S. PATENT DOCUMENTS

| | | |
|---|---|---|
| 7,074,463 B2 | 7/2006 | Jones et al. |
| 7,095,464 B2 | 8/2006 | Ito |
| 7,233,378 B2 | 6/2007 | Obayashi et al. |
| 7,505,104 B2 * | 3/2009 | Watanabe ............... G02B 1/11 349/112 |
| 7,538,947 B2 | 5/2009 | Yoshinari et al. |
| 7,542,118 B2 | 6/2009 | Miyauchi et al. |
| 7,628,496 B2 | 12/2009 | Matsuura |
| 7,708,414 B2 | 5/2010 | Kameshima et al. |
| 7,815,320 B2 | 10/2010 | Ookubo et al. |
| 7,815,321 B2 | 10/2010 | Yoshinari |
| 7,815,322 B2 | 10/2010 | Ookubo et al. |
| 7,902,266 B2 | 3/2011 | Lin et al. |
| 8,659,829 B2 | 2/2014 | Walker, Jr. et al. |
| 9,541,700 B2 * | 1/2017 | Harada ............... G02B 5/0226 |
| 2004/0240070 A1 * | 12/2004 | Suzuki .................... G02B 1/111 359/599 |
| 2005/0068628 A1 * | 3/2005 | Masaki ............... G02B 5/0278 359/599 |
| 2005/0100690 A1 | 5/2005 | Mayer et al. |
| 2005/0152034 A1 | 7/2005 | Matsunaga |
| 2006/0153979 A1 | 7/2006 | Asakura et al. |
| 2007/0177271 A1 * | 8/2007 | Matsunaga ............ G02B 1/118 359/582 |
| 2007/0253064 A1 | 11/2007 | Ookubo et al. |
| 2008/0137204 A1 | 6/2008 | Yoshinari et al. |
| 2008/0137206 A1 * | 6/2008 | Nakamura ........ C08F 222/1006 359/601 |
| 2009/0262429 A1 * | 10/2009 | Ookubo ............... G02B 5/0242 359/599 |
| 2012/0064296 A1 | 3/2012 | Walker, Jr. et al. |
| 2012/0300304 A1 | 11/2012 | Gollier et al. |
| 2013/0038939 A1 | 2/2013 | Walker, Jr. et al. |
| 2013/0236697 A1 | 9/2013 | Walker, Jr. et al. |
| 2013/0302594 A1 | 11/2013 | Sugiyama et al. |
| 2014/0355125 A1 | 12/2014 | Boyd et al. |
| 2016/0154272 A1 | 6/2016 | Kim et al. |

FOREIGN PATENT DOCUMENTS

| | | |
|---|---|---|
| JP | 2010-280203 A | 12/2010 |
| JP | 2012-230364 | 11/2012 |
| WO | 2015/199796 | 12/2015 |

* cited by examiner

LOW SPARKLE MATTE COATS AND METHODS OF MAKING

CROSS REFERENCE TO RELATED APPLICATIONS

This application is a continuation of U.S. application Ser. No. 15/760,180, filed Mar. 14, 2018, now pending, which is a national stage filing under 35 U.S.C. § 371 of PCT/US2016/051943, Sep. 15, 2016, which claims the benefit of Provisional Application No. 62/218,963, filed Sep. 15, 2015, the disclosures of which are incorporated by reference in their entireties herein.

FIELD

The present invention relates to matte coats (e.g., such as are used in front surface films on displays, etc.), in particular, matte coats exhibiting low sparkle and low grain, and methods of making such coats.

BACKGROUND

It is well known to incorporate coats in front surface films such as are used on displays, touch screens, windows, and other optical devices to protect the device and perhaps impart other desired benefits (e.g., privacy films, etc.). Many materials selected for such applications yield coats or films having smooth, glossy surfaces. Such surfaces tend to yield undesired glare due to external light reflected from the optical device, tending to interfere with desired use and performance of the optical device.

As a result, when used to form coats for front surface films, some coating materials are subjected to surface roughening or haze-inducing treatments to reduce the glare yielded by the resultant coat. In such antiglare films, scattering phenomenon (surface diffusion) of light caused by surface irregularity is utilized.

In some instances, sometimes in conjunction with surface treatments, antiglare films are also known in which particles having a refraction index different from that of a binder matrix are mixed into the binder matrix to impart internal scattering (internal diffusion) of light passing through the film caused by the difference in refraction indices of the binder matrix and particles and resultant optical interface. U.S. Pat. No. 7,708,414 (Kameshima et al.) discloses an illustrative example of antiglare film comprising particles in a binder matrix.

Many conventional treatments for glare reduction, sometimes referred to as anti-glare ("AG") treatments or coatings, yield films that exhibit small scale alterations of light and dark producing an undesirable, grainy, scintillating effect. This effect is commonly referred to as "sparkle". The observed effect is highly angle-dependent such that minute changes in viewing angle produce an effect that is variously described as "scintillating", "sparkly", or "grainy noise".

While we do not wish to be bound by this theory, FIG. 1 is a schematic diagram showing what is believed to be the mechanism for undesirable sparkle induced by a conventional AG film on an optical display. In this typical application, light emitting article 10 (e.g., an electronic display) comprises array 12 of light emitting pixels 14a, 14b, 14c, et seq. which emit light rays 16a, 16b, 16c, et seq. that are emitted from article 10 through face 19 of cover glass 18. To reduce glare, anti-glare film 20 comprising film 22 with ant-glare surface 24 has been adhered to face 19 with adhesive 26. Although film 20 serves to reduce the glare which would otherwise be generated by face 19, it does not transmit light rays 16a, 16b, 16c, et. seq. uniformly; instead emitting rays 28a, 28c relatively directly from rays 16a, 16c, respectively, while other rays such as rays 28b are emitted at substantially off axis orientation from display-emitted rays 16b. As a result, to an observer, rays 28a, 28c will be perceived as relatively bright portions of the image while rays 28b will be perceived as relatively dark. The impact will vary according to viewing angle, over small variations in perspective. The impact of such variation is perceived as sparkle.

In its most benign forms, sparkle may be merely a minor, aesthetic distraction. When more pronounced, however, it degrades resultant image quality, interfering with performance and utility of the optical device.

Although the causes of sparkle are not entirely understood, observation reveals that the magnitude of sparkle may depend on such parameters as the surface texture of the subject coating, the distance between the subject film and underling components of the optical device (e.g., the pixels of a display), and the size of the display pixels. A problematic trend is that sparkle tends to increases as pixel size of an underlying display decreases. Thus displays in which display resolution is increased by reducing the size of constituent pixels tend to exhibit problematic sparkle.

The need exists for improved matte coats that provide desired anti-glare performance while also providing desired low sparkle.

SUMMARY

The present invention provides novel matte coats that provide a surprising combination of light transmissiveness, low sparkle, low grain (i.e., visible and therefore undesirable coating attributes and features), and high uniformity. If desired, coats of the invention may made so as to exhibit high hardness in conjunction with these characteristics. Aspects of the invention include such matte coats, optical assemblies comprising such matte coats, and methods of making such matte coats.

Matte coats of the invention have a first major surface and are characterized by a surprising combination of properties. In brief summary, matte coats of the invention comprise, and may consist essentially of, a first layer defining the first major face of the matte coat. The first layer comprises, and may consist essentially of, a polymeric matrix and a plurality of forming bodies entrained therein. The forming bodies have an index of refraction ($n_b$) and a select average major dimension. The polymeric matrix of the first layer has an index of refraction ($n_m$), and a first major surface and a second major surface. In the surface zone at the first major surface there is a plurality of protuberances corresponding to forming bodies entrained within the first layer. In accordance with the invention, $n_b$ and $n_m$ are relatively close (e.g., typically within about 0.1), preferably identical, to one another. As a result, matte coats of the invention can provide a desirable combination of optical properties.

Matte coats of the invention are novel in that they comprise forming bodies entrained in a polymer matrix; distinctive features of the invention including the presence of protrusions, and the relative Z-axis position of the plurality of forming bodies.

Briefly summarizing, an optical assembly of the invention comprises a matte coat of the invention optically coupled to the light emitting surface of a light emitting article.

The entrained, high relative Z-axis position of forming bodies in the surface zone of coats of the invention is achieved using a novel method which has been found to provide surprising results.

When coating compositions comprising particles in a liquid medium, in instances where the particles have a higher density than the medium, there is a tendency for the particles to sink. This phenomenon may be understood with consideration of Stoke's law which is mathematically stated as:

$$F_d = 6\pi\mu RV$$

where:
F$_d$ is the frictional force ("Stoke's drag") acting on the interface between the fluid and the particle;
µ is the dynamic viscosity of the fluid (kg/m*s);
R is the radius of the spherical object (m); and
V is the flow velocity of the object (m/s).

In the case of a particle in a liquid medium where the particle is denser than the medium, the tendency of the particle to sink in the medium due to the difference between its weight and its relatively buoyancy, is a function of the excess force F$_g$ stated as:

$$F_g = (\rho_p - \rho_f) g 4/3 \,\pi R^3$$

where:
$\rho_p$ is the mass density of the particle (kg/m$^3$);
$\rho_f$ is the mass density of fluid (kg/m$^3$), respectively;
g is gravitational acceleration (m/s$^2$); and
R is the radius of the spherical object (m).

Taking the force balance F$_d$=F$_g$ to evaluate sinking speed, and solving for the velocity V gives the terminal velocity V$_s$. In accordance with the invention, the forming bodies are selected and forming composition is formulated such that when coated, the composition may be cured in a sufficiently short time that a surface zone with protuberances as described herein is formed. Note that since buoyant force increases as R$^3$ and Stokes' drag increases as R, the terminal velocity increases as R$^2$ and thus varies greatly with particle size. If the particle is falling in the viscous fluid under its own weight, then a terminal velocity, or settling velocity, is reached when this frictional force combined with the buoyant force exactly balances the gravitational force.

We have surprisingly found that through selection of forming bodies having suitable size and density coupled with selection of curable liquid components of suitable viscosity, density, solids loading, and speed of cure that the following method will yield matte coats having a surface zone as described herein. Such resultant matte coats will provide the surprising results described herein if, in addition, the forming bodies have suitable index of refraction as compared to the index of refraction of the polymeric matrix.

In brief summary, a method of the invention comprises method for making a low sparkle matte coat comprising the steps of:

preparing a forming composition as described herein comprising a film-forming curable mixture and a plurality of forming bodies, depositing the forming composition into a coating having a major surface; then curing the curable mixture of the coating. By using a forming composition as described herein, as the coating is cured (i.e., solvent is removed and reactive components react) so as to form the polymeric matrix, the coating tends to shrink and develop protuberances on the major surface thereof corresponding to forming bodies entrained within the polymeric matrix. In accordance with the invention, the film-forming curable mixture has a viscosity and density, and the forming bodies have a density and an average major dimension such that after being coated, the curable components may be dried and reacted to yield the desired polymeric matrix containing an effective number of forming bodies which have sunk to only a limited extent such that they are located proximate to the first major surface of the subject layer with a skin of the polymeric matrix forming an upwardly swelled portion or protuberance.

Matte coats of the invention, having the surprising combination of useful properties described above, can be made at low cost. The method of the invention is capable of robust, high speed manufacturing, making it well suited for industrial application.

BRIEF DESCRIPTION OF THE DRAWINGS

The invention is further explained with reference to the drawing wherein:

These figures are intended to be merely illustrative and not limiting; FIGS. 1-4, 5a, and 5b are not to scale.

KEY AND GLOSSARY

Figure 1:
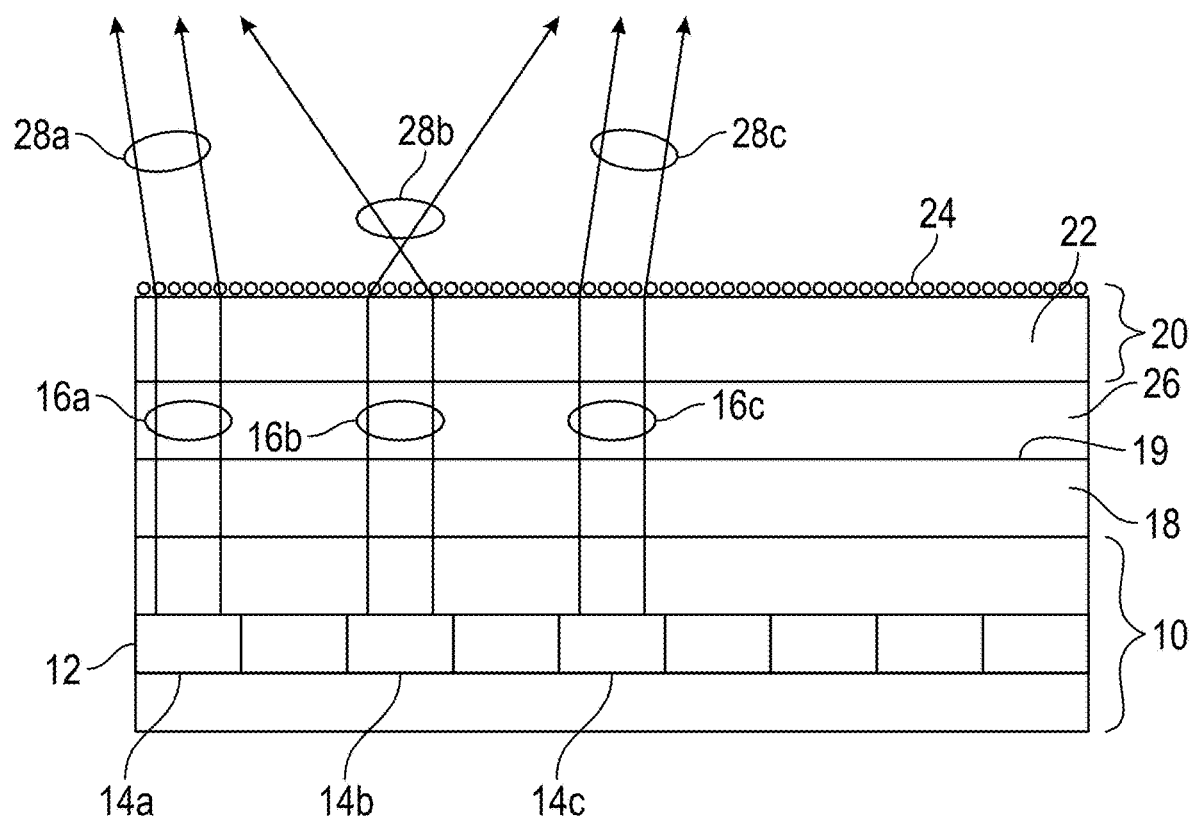
FIG. 1 is a schematic diagram showing undesirable sparkle induced by a conventional AG film on an optical display.

For the following defined terms, these definitions shall be applied, unless a different definition is given in the claims or elsewhere in this specification.

The term "clarity" is used to mean the ability of a specimen to transmit the fine details of an object or image viewed through it. It is negatively impacted by absorption and by scattering. A quantitative value for clarity can be determined by designating an acceptable (small) spreading angle for transmitted light; then, the clarity is the percentage of all transmitted light which is transmitted within that spreading angle.

The term "haze" is used to mean the percentage of transmitted light which in passing through the specimen deviates from the incident beam, by more than a specified angle, due to forward scattering. Haze can be broken down into two components; one component being the "bulk haze" (sometimes also referred to as the "internal haze"), and the other being the "surface haze".

The term "bulk haze" is used to mean the haze that results from conditions in the bulk (i.e., the interior) of the specimen, such as the presence of impurities, voids, bubbles, particles, inclusions, regions of differing refractive index, or other optical inhomogeneities.

In practice, values for bulk haze and surface haze can be determined by first obtaining a value for the total haze by an appropriate optical test, then covering the surface with a smooth coating of an index-matching material (often a fluid), testing again to obtain the value for the bulk haze, and then determining the surface haze as the difference between the total haze and bulk haze values.

The term "light transmissive" is used to mean allowing the transmission of a significant portion of incident light. All incident light must be either reflected, absorbed, or transmitted by a specimen, so absorption, specular reflection, and back-scattering reduce transmission, but forward-scattering does not.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "sparkle" is used to mean a phenomenon relating to an optical display wherein the displayed image appears to be covered by small highlights that scintillate with relative movement of the display and observer.

The term "surface haze" is used to mean a phenomenon relating to an optical display wherein a displayed image appears to be covered by small colored highlights that scintillate with relative movement of the display and observer.

The term "Z-axis" is used to refer to position relative to the first major face of the matte coat along an axis extending perpendicularly from the first major face toward the rear of the matte coat. The Z-axis, "X-axis", and "Y-axis" are mutually perpendicular. When a matte coat is arranged in a flat or planar configuration, the X-axis and Y-axis are defined by the length and width of the coat and its thickness is defined in the Z-axis.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, wt %, and the like are synonyms that refer to the concentration of a substance as the weight of that substance divided by the weight of the composition and multiplied by 100.

The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

DETAILED DESCRIPTION OF ILLUSTRATIVE EMBODIMENTS

Matte Coat

Figure 2:
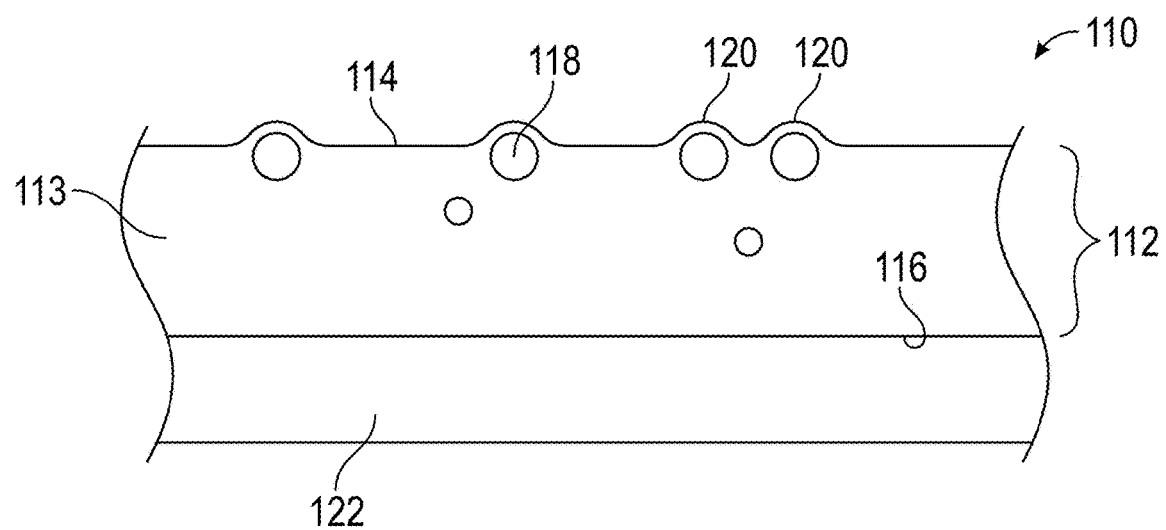
FIG. 2 is an idealized cross sectional view of an illustrative embodiment of a matte coat of the invention.

FIG. 2 is a cross sectional view of a portion of an illustrative embodiment of a matte coat of the invention. Matte coat 110 comprises first layer 112 comprising polymeric matrix 113 having first major surface 114 and second major surface 116. Matte coat 110 comprises a plurality of forming bodies 118 entrained in polymeric matrix 113. First major surface 114 has a plurality of protuberances 120 corresponding to forming bodies 118. In this embodiment, matte coat 110 further comprises optional adhesive layer 122 on second major surface 116 (i.e., the back face of polymeric matrix 112).

Figure 3:
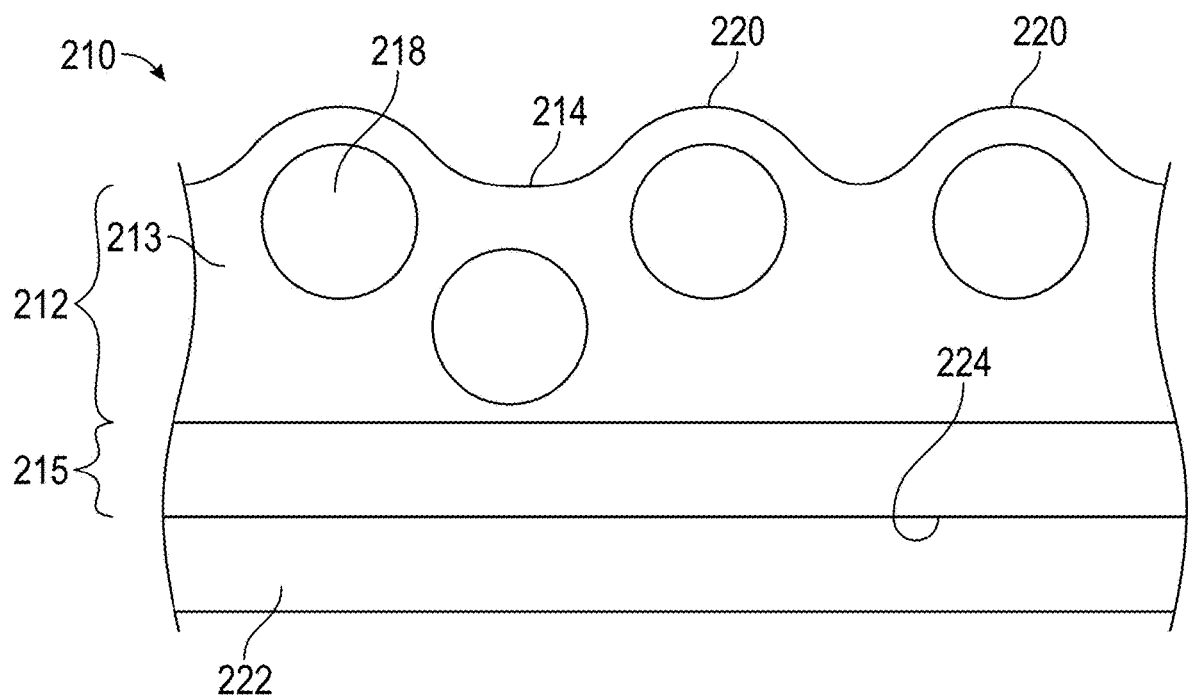
FIG. 3 is an idealized cross sectional view of another illustrative embodiment of a matte coat of the invention.

FIG. 3 is a cross sectional view of a portion of another illustrative embodiment of a matte coat of the invention. Matte coat 210 comprises first layer 212 and second layer 215. First layer 212 comprises polymeric matrix 213 having first major surface 214 and second major surface 216. Second layer 215 is on second major surface 216 of polymeric matrix 212. Matte coat 210 comprises a plurality of forming bodies 218 entrained in first layer 213. First major surface 214 has a plurality of protuberances 220 corresponding to forming bodies 218. In this embodiment, matte coat 210 further comprises adhesive layer 222 on second major face 224 of second layer 215.

If desired, matte coats with three or more layers may be formed in accordance with the invention.

Typically, matte coats of the invention will have a sparkle rating of less than 5.0, in some instances less than 3. A sparkle rating of 3 is generally considered to be about the limit of what can be perceived by unaided human eye.

The curable components are selected to yield a polymeric matrix having an index of refraction that is relatively similar to that of the forming bodies used so as to minimize bulk haze and other effects upon light being transmitted through the matte coat. Typically, the difference between the index of refraction ($n_m$) of the polymeric matrix and the an index of refraction ($n_b$) of the forming bodies is about 1.0 or less, preferably about 0.05 or less, and most preferably about 0.03 or less. To the extent index of refraction $n_b$ is different from the index of refraction $n_m$ the matrix layer will tend to exhibit bulk haze which may interfere with viewing images, etc. which are viewed through the matte film.

Matte coats of the invention are distinguished by the presence of a surface zone having a plurality of protuberances and a plurality of corresponding forming bodies which are entrained in the layer. The surface zone is the portion of the first layer at the first major face thereof wherein a plurality of forming bodies are arranged in proximity to the first major face with a skin of polymeric material thereover to define protuberances. The skin is typically preferably from about 0.4 to about 0.8 microns thick.

Typically the thickness of the first layer (i.e., from the second major face to the most distant portions of the protuberances on the first major face) is at least 0.7 microns larger than the average major dimension of the forming bodies.

The forming bodies are preferably spaced apart so as to have polymeric matrix between adjacent polymeric bodies, and in some instances preferably substantially in a monolayer.

Matte coats of the invention provide a surprising and heretofore unattained combination of properties.

In typical embodiments, the front face (i.e., first major surface of the first layer) of matte coats of the invention have a surface haze of about 40% or less, and in some embodiments about 25% or less. The benefits of the advantageous sparkle reduction provided by the invention tend to be more prominent at lower haze ratings.

In some embodiments, matte coats of the invention have a bulk haze of about 10 percent or less.

In typical embodiments, matte coats of the invention have a clarity of less than about 95, preferably less than 90, and most preferably less than 80.

Depending upon selection of suitable material, matte coats of the invention may be made in desirable hardness. If desired, they may be made having a hardness of at least about H according to ASTM D3363-00.

In typical embodiments, matte coats of the invention have a thickness of about 10 microns or less. As will be understood, embodiments of matte coats with greater thicknesses may be made in accordance with the invention.

Method of Making

It has been surprisingly discovered that matte coats with a first major face with a select topography which imparts desired optical effects can be formed through curing of select combination of materials as described herein. As a result, the invention provides a surprising combination of performance and ease.

Figure 4:
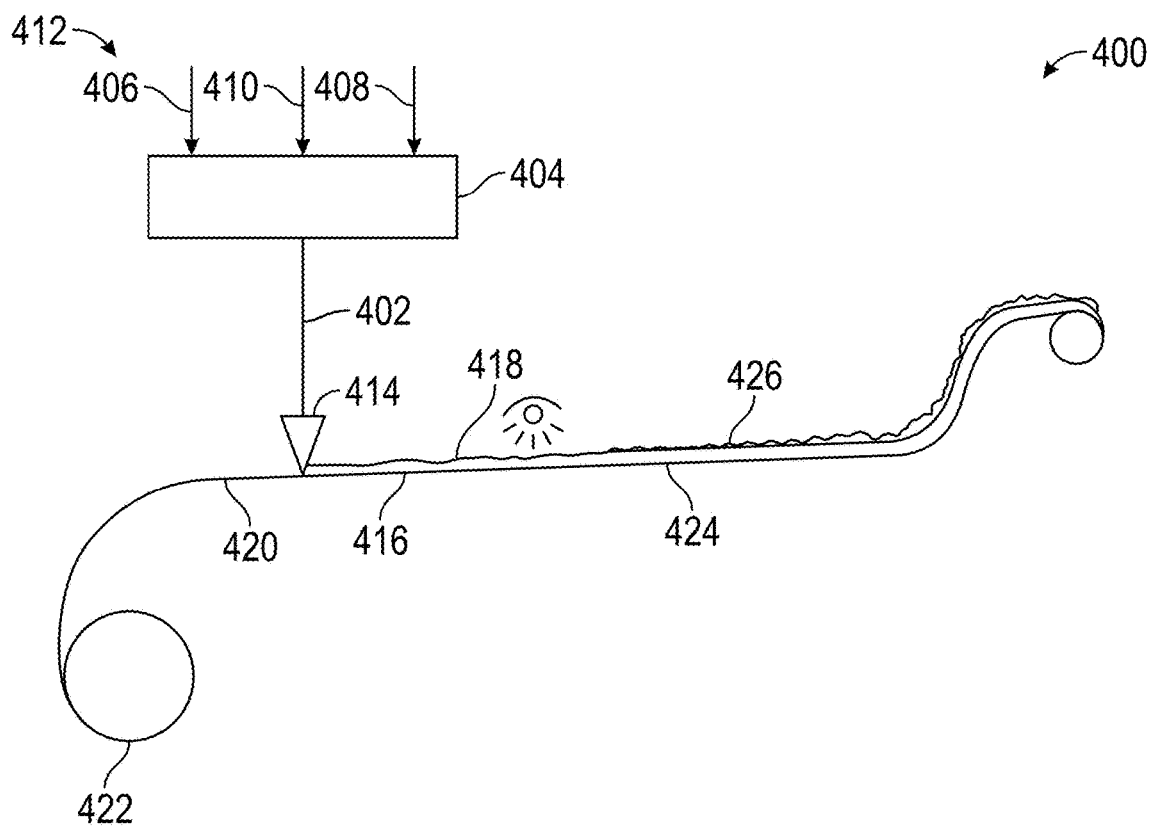
FIG. 4 is a schematic diagram of an illustrative embodiment of the method of the invention.

FIG. 4 illustrates an illustrative embodiment 400 of the method of the invention, the method comprising the steps of:

preparing forming composition 402 by mixing 404 components in accordance with the invention (i.e., film-forming curable mixture 406, forming bodies 408, solvent 412, and optional densifying particles 410);

depositing 414 forming composition 402 into coating 416 having a major surface 418 (e.g., on a substrate 420 such as reusable liner wound from a roll, onto a desired surface, etc.); then curing the curable mixture of coating 416, such as by exposure 424 to suitable actinic radiation (e.g., infrared radiation, ultraviolet radiation, etc.) to cure the coating (i.e., dry it by driving off solvent and induce reaction among constituent materials to cause the curable mixture to polymerize and form the desired first layer 424 with protuberances 426. In accordance with the invention, the film-forming curable mixture has a viscosity and density, and the forming bodies have a density and an average major dimension such that after being coated, the curable components may be dried and reacted to yield the desired polymeric matrix containing an effective number of forming bodies which have sunk to only a limited extent (e.g., up to about 10% of their diameter) such that they are located proximate to the first major surface of the subject layer with a skin of the polymeric matrix forming an upwardly swelled portion or protuberance.

Thereafter, the first layer may be wound into roll form for storage, transport, application to desired surfaces, application of adhesive to its back face, etc.

In accordance with the invention, during the curing step, solvent is removed from the coating and the reactive constituents react to form the desired polymeric matrix. In the course of doing so, the level of the coating tends to recede, sinking down between forming bodies proximate the first surface such that the resulting first major face is textured with a plurality of protuberances. Due to the relatively high viscosity of the curing composition, the forming bodies are not exposed and substantially all of them are covered by at least a protuberance of lamina or skin of cured polymeric matrix material. The resultant protuberance (made up of at least polymeric matrix material of the skin, and in some instances the portions of entrained forming bodies which lie above the base line of the surrounding portions of the first major surface as well as overlying skin).

It has been surprisingly found that forming compositions comprising forming bodies and curable materials of relatively high density, in compositions of relatively high viscosity, can be used to form layers with textured surfaces as described herein.

In accordance with the invention, the film-forming curable mixture has a viscosity and density, and the forming bodies have a density and an average major dimension such that after being coated, the curable components may be dried and reacted to yield the desired polymeric matrix containing an effective number of forming bodies which have sunk to only a limited extent such that they are located proximate to the first major surface of the subject layer with a skin of the polymeric matrix forming an upwardly swelled portion or protuberance.

Figure 5A:
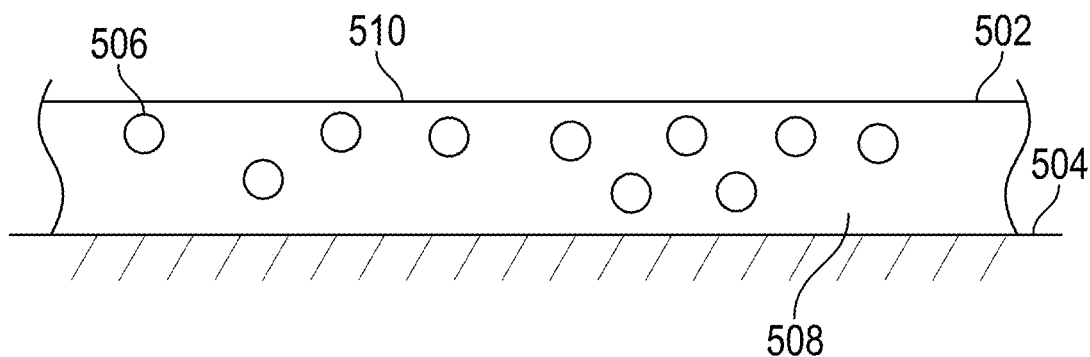
FIGS. 5a and 5b are idealized cross sectional views of an embodiment of forming a matte coat of the invention.
Figure 5B:
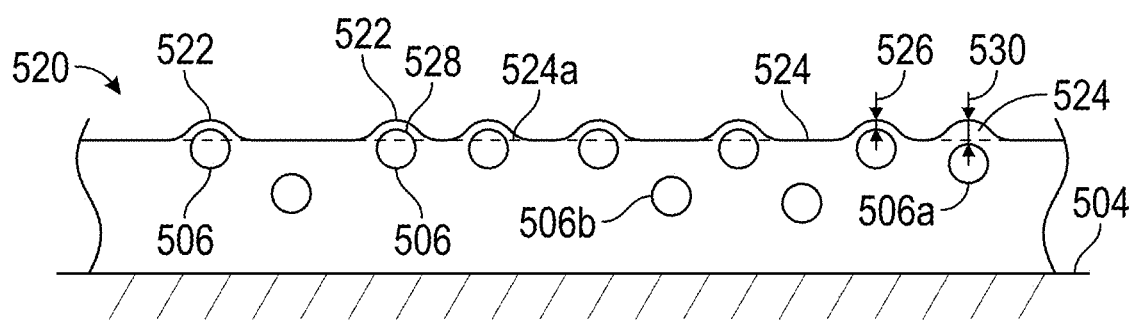
Figure 6:
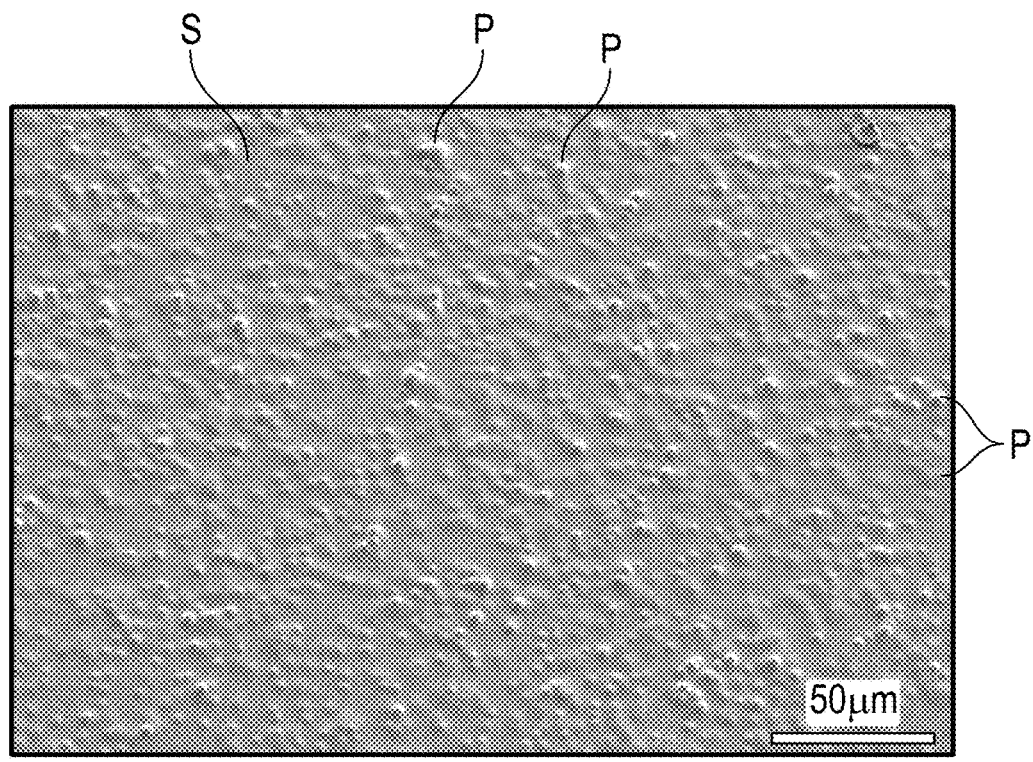
FIGS. 6-11 are scanning electron microscope views of select matte coats from the Examples.
Figure 7:
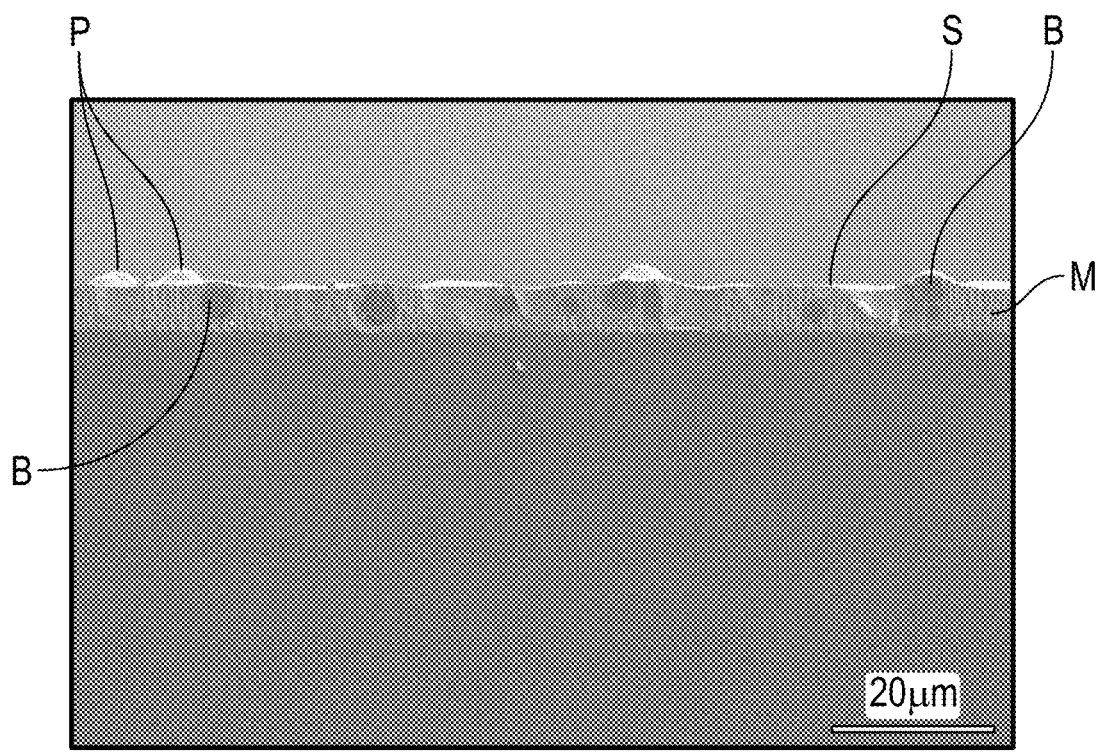
Figure 8:
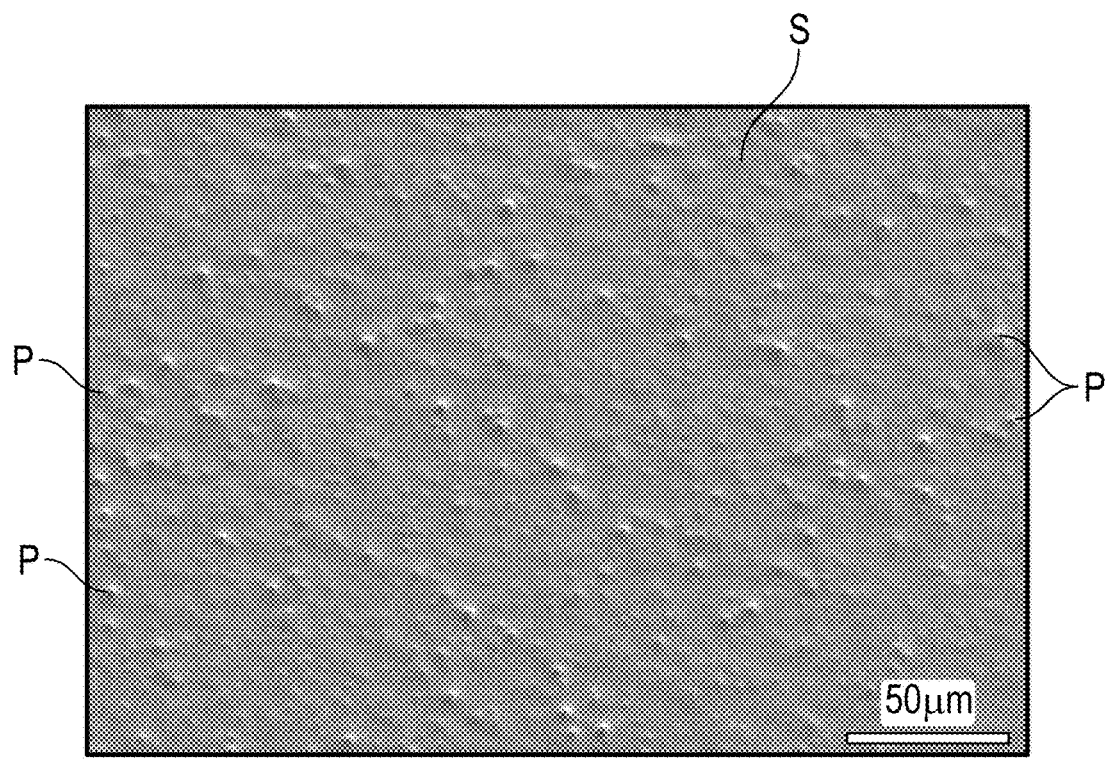
Figure 9:
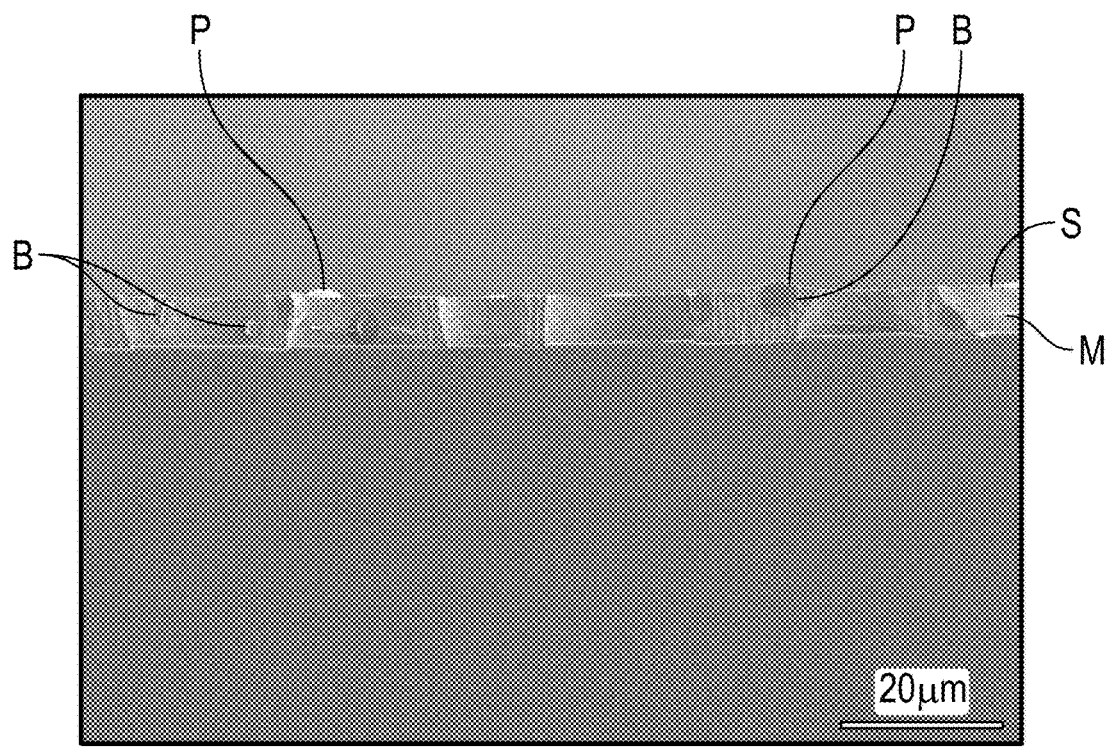
Figure 10:
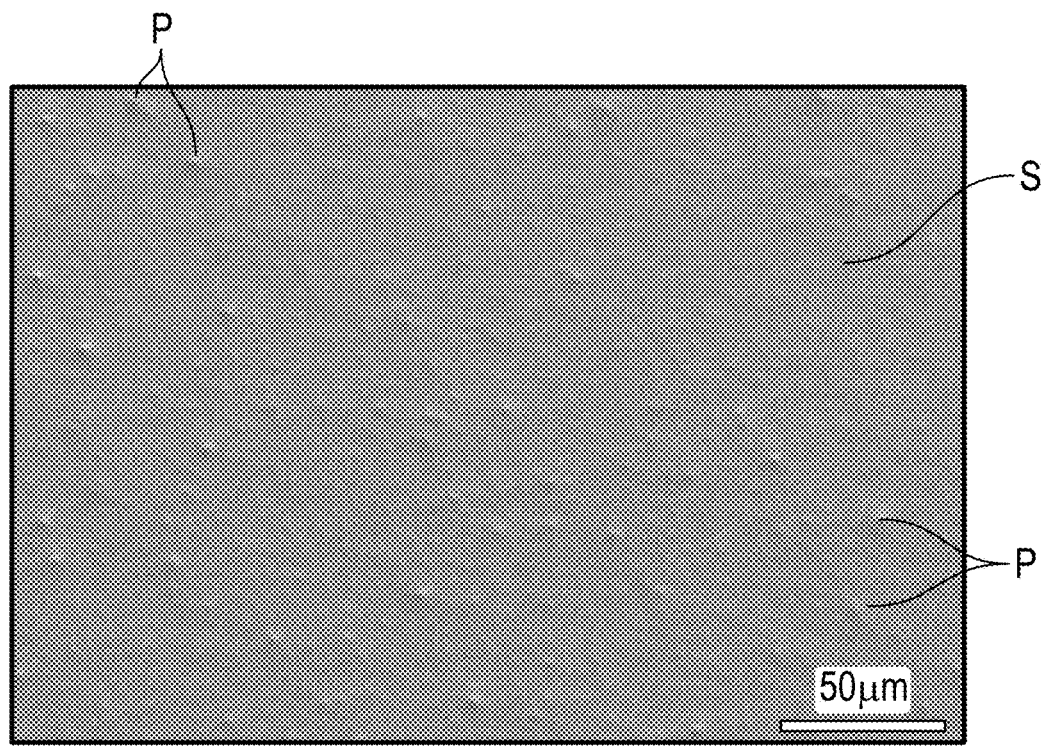
Figure 11:
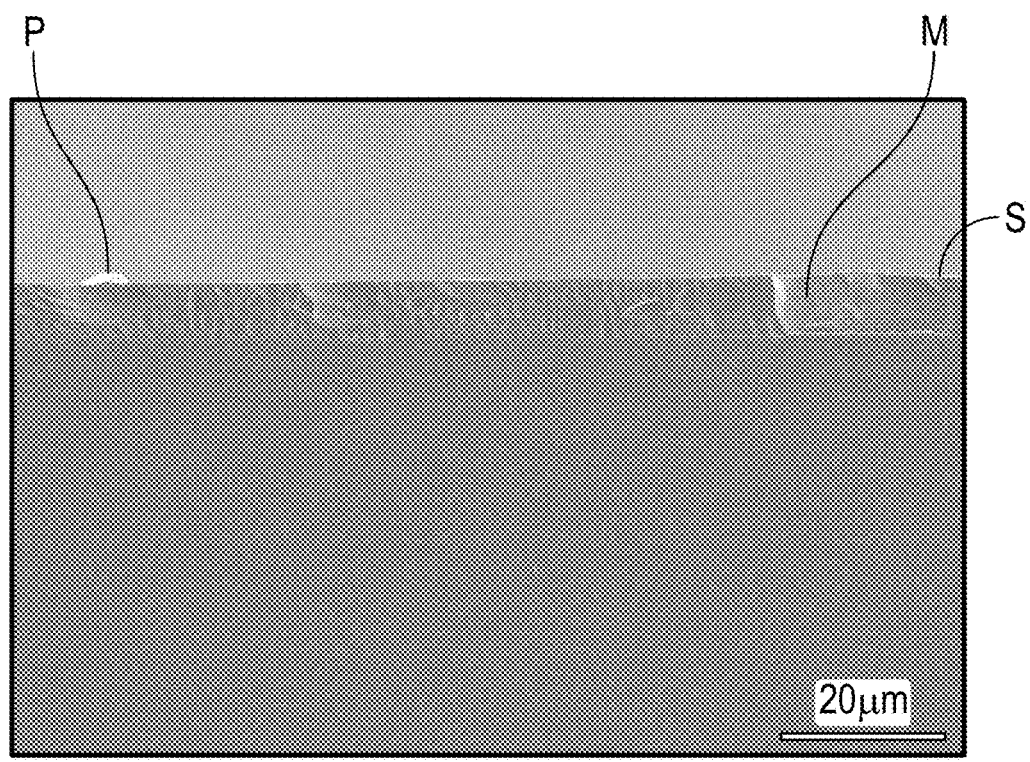

FIG. 5a shows a deposit 502 of coating composition on surface 504. Deposit 502 comprises forming bodies 506 dispersed in mass 508 of the liquid coating composition. Some of forming bodies 506 are positioned closer to first surface 510. As the curable components are cured (i.e., solvent is removed and components react), the level of first surface 510 will tend to recede, yielding the structure shown in FIG. 5b, wherein matte coating 520 has a plurality of protuberances 522 corresponding to entrained forming bodies 506. Protuberances 522 are separated by land portions 524 of first surface 510. Each protuberance is a laminae 526 of polymeric matrix covering an entrained forming body 506. In some instances, within a protuberance a portion 528 of an entrained forming body 506, though covered by skin or lamina 526 extends above the level of the land portions 524 (shown as dotted line 524a). In some instances, within a protuberance the entrained forming body 506 does not extend above level 524a (e.g., such as forming body 506a) and protuberance 530 is made up entirely of the lamina or skin. The protuberances provide desired matte properties as described herein. Other forming bodies 506b, which are located deeper within the first layer do not have corresponding protuberances.

In illustrative embodiments, the film-forming composition has a viscosity of from about 75 to about 3,000 cps, sometimes preferably from about 150 to about 1,200 cps, when deposited into coating form. In instances where longer cure times are involved (e.g., through selection of such curable components, use of lower intensity actinic radiation, slower processing speeds, etc.), it will typically be preferred to use higher viscosity compositions.

In illustrative embodiments, the film-forming composition has a density of about 0.95 or more when deposited into coating form. In instances where longer cure times are involved (e.g., through selection of such curable components, use of lower intensity actinic radiation, slower processing speeds, etc.), it will typically be preferred to use higher density compositions.

In illustrative embodiments, the forming bodies have a density of from about 1.1 to about 2.5. In instances where longer cure times are involved (e.g., through selection of such curable components, use of lower intensity actinic radiation, slower processing speeds, etc.), it will typically be preferred to use forming bodies having lower density.

The resultant layers are well suited for use as low sparkle matte coats, providing heretofore unattainable combinations of properties.

The forming composition may be deposited in desired fashion (e.g., on a temporary support such as a release liner, or on a substrate member to which it is permanently bonded)

via many known coating techniques (e.g., slot and die, roll coating, etc.). In an illustrative embodiment of the invention, coatings of the invention can be made using slide coating. Such approaches permit the formation of multilayer coatings in a single application step. In accordance with the invention, slide coating is carried out utilizing high density, high viscosity fluids to prevent forming body settling and agglomeration. As a result, slide coating typically tends to avoiding significant agglomeration of forming bodies and formation of bare spots (sometimes called "lakes") as are encountered with conventional coating techniques used at high forming body loading.

The film-forming curable mixture comprises one or more reactive polymeric materials and one or more solvents. In some embodiments, the mixture may comprise one or more monomers which are reactive with at least one of the reactive polymeric materials.

Typically, increasing relative amounts of monomer and solvent will tend to reduce the viscosity of the forming composition, thereby tending to speed the rate at which forming particles will tend to sink therein and shortening the window of time during which curing can be carried out.

Illustrative examples of reactive polymeric materials include thermosetting or thermoplastic polymers such as polycarbonates, poly(meth)acrylates (e.g., polymethyl methacrylate ("PMMA"), polyolefins (e.g., polypropylene ("PP")), polyurethanes, polyesters (e.g., polyethylene terephthalate (PET)), polyamides, polyimides, phenolic resins, cellulose diacetate, cellulose triacetate, polystyrene, styrene-acrylonitrile copolymers, epoxies, and the like. In some embodiments, preferred polymers include cellulose acetate butyrate and ethoxylated trimethylolpropane triacrylate.

Monomers chosen must be compatible with the polymers in the chosen solvent(s), such as acrylates.

Suitable solvents can be selected by those skilled in the art. An illustrative example is propylene glycol methylether (e.g., DOWANOL® PM) which is an effective solvent for many suitable reactive polymers and monomers that is also relatively dense.

An aspect of the present invention is that relatively high density of the coating fluid is used to achieve positioning of the forming bodies at the surface zone of the resultant first layer as desired. In some embodiments (e.g., where relatively less viscous combinations of polymer, solvent, and monomer (if any) are used), nanoparticles such as silica may be incorporated in the film forming composition to increase its effective density or viscosity so as slow the tendency of the forming bodies to sink away from the first major surface before curing is complete. An advantage of such additives is that they can also impart increased hardness to the resultant matte coat.

In some embodiments, other additives may be added to speed curing (e.g., photoinitiator in the case of UV curable components).

In some embodiments, the forming bodies will be present at weight loading of from about 0.5 to about 60 wt % solids in the forming composition. If the weight loading is too high, forming bodies may tend to agglomerate, thereby creating defects in the resultant matte coating such as physically disrupted portions, exposed and loose forming bodies, and intervening bare spots or "lakes" in which desired glare reduction without sparkle is not achieved. Also, at high weight loading, the forming bodies may tend to fail to become entrained within the polymeric matrix, resulting a matte coating with exposed forming bodies protruding from the first major face of the first layer. This is generally undesirable, as partially exposed forming bodies are susceptible to becoming detached in use, generating undesired debris and yielding defects in the matte coat which may be aesthetically or functionally undesirable. The lack of exposed forming bodies (and avoidance of the deleterious effects arising therefrom) are among the surprising results of the invention.

Forming Bodies

In the present invention, the forming bodies function to impart desired texture or protuberances to the front face of the matte coat (i.e., the first major face of the first layer of the polymeric matrix) and also optically couple with the polymeric matrix such that light can be transmitted through the matte coat without undesired effects.

In many embodiments, the forming bodies are rounded in shape, and in some instances substantially spherical. Such shapes are not required, though are sometimes preferred as being easier to use and tending to yield more uniform results.

The forming particles are characterized by size (i.e., average major dimension (which in the case of a sphere is its diameter)).

In some instances, forming particles used in a matte film will be varied dimension and shape. In other instances, dimension, shape, or both will be substantially uniform.

In order that they can be used in the method of the invention to achieve the desired protuberances, it is sometimes preferred that the difference in density between the forming bodies and the liquid resin composition be less than about 0.25. In instances where materials having greater difference in density are used (e.g., denser forming bodies), the forming bodies may tend to sink more rapidly than desired so as to reduce the degree for formation of protuberances during curing.

It is typically preferred that the forming bodies and polymeric matrix be of the same color (i.e., be chromatically similar) at least with respect to the wavelength band(s) of light in which the matte coat is intended to be used, and also to have similar index of refraction as the polymeric matrix as described herein.

In typical embodiments, for applications where the matte film will be positioned at about arms' length from a viewer, the average major dimension of the forming bodies is from about 0.8 to about 10 microns, with forming bodies from about 2 to about 5 microns typically being preferred, and about 3 microns typically being more preferred. In such applications, if the forming bodies have an average major dimension of larger than about 5 microns, the resultant matte film may be subject to one or both of undesirable sparkle and undesirable graininess. In such applications, the threshold for forming bodies which can be detected by the unaided human eye is about 3 microns.

Adhesive

In some embodiments, matte coats of the invention can be formed on temporary supports from which they are separated and then bonded to a desired surface (e.g., by lamination or bonding with adhesive).

In some embodiments, an adhesive, optionally covered with a protective release liner, will be provided on the back face of the matte coat to bond it to desired surface. Many suitable adhesives for optical applications are known; those with ordinary skill in the art will be readily able to select suitable adhesive for a desired application.

Optical Assembly

The advantageous performance characteristics of matte coats of the invention may be used to beneficial effect on a variety of light emitting surfaces, combinations which are referred to herein as optical assemblies. Illustrative examples include privacy films, window film, phones, tablets, notebook computers, monitors, televisions, signage displays, etc.

EXAMPLES

The invention may be further understood with reference to the following illustrative examples. Amounts expressed as "part" and "%" are based on weight unless otherwise specified.

Materials

The following materials were used to make coatings for the Examples.

| Code | Component |
|------|-----------|
| A | EB 8301R: aliphatic urethane hexaacrylate, from Cytec |
| B | SR9035: ethoxylated, trimethylolpropane triacrylate, from Sartomer |
| C | CAB-381-20: cellulose acetate butyrate, from Eastman Kodak |
| D | ESACURE ™ One: difunctional alpha-hydroxy ketone, from Evonik Industries |
| E | TEGO ® Glide 100: polyether-modified polysiloxane, from Evonik Industries |
| F | Dowanol ® PM: propylene glycol methylether, from Dow |
| G | MX 150: 1.5 micron PMMA forming bodies, from Soken Chemical and Engineering Co. |
| H | MX 300: 3 micron PMMA forming bodies, from Soken Chemical and Engineering Co. |
| I | MX 500: 5 micron PMMA forming bodies, from Soken Chemical and Engineering Co. |
| J | MBX-8: 8 micron PMMA forming bodies, from Sekisui Plastics Co. |
| K | 20 nm silica solution (as described in US2013/0302594 A1, page 7 section 0058) |

25.25 grams of 3-methacryloxypropyl-trimethoxysilane ("SILQUEST® A174") and 0.5 gram of 4-hydroxy-2,2,6,6-tetramethylpiperidine 1-oxyl (5 wt %; "PROSTAB") was added to 450 grams of 1-methoxy-2-propanol, which was in turn added to 400 grams of SiO2 sol (20 nm; diameter; obtained under the trade designation "NALCO® 2327" from Nalco Company) in glass jar with stirring at room temperature for 10 minutes. The jar was sealed and placed in an oven at 80° C. for 16 hours. Water was removed from the resulting solution with a rotary evaporator at 60° C. until the solid wt % of the solution became close to 45 wt %. 200 grams of 1-methoxy-2-propanol was charged into the resulting solution, and then remaining water was removed by using the rotary evaporator at 60° C. This latter step was repeated for a second time to further remove water from the solution. The concentration of SiO2 nanoparticles was adjusted to 45 wt % by adding 1-methoxy-2-propanol. This sol is referred to as Sol L in this document.

Coated Films

To prepare coated films as described in the Examples, solutions having the compositions shown in Tables 1, 3, 5, and 7 were applied on one surface of polyethylene terephthalate film via slide coating (as generally described in U.S. Pat. Nos. 6,214,111 and 6,576,296 except using select materials as described herein), heated and dried at 70° C., for 1.5 minutes, and then exposed to UV light for 1 to 2 seconds. Properties of the resultant coated films are reported in Tables 2, 4, 6, and 8.

Analytical Methods

Sparkle

Measurement of sparkle was performed using a SMS-1000 from Display-Messtechnik & Systeme (Display-Messtechnik & Systeme Gmbh & C. KG, Lenaustr. 3—D72108 Rottenburg/Neckar, Germany (www.display-metrology.com)). The SMS-1000 quantifies sparkle as high frequency luminance variance.

Sparkle level as measured with a SMS-1000 correlates well with visual evaluations using an analytic hierarchy process (AHP) based on paired comparisons done by lab personnel familiar with identifying sparkle. The sparkle rating or number, itself, is a ratio of the standard deviation divided by the mean of the luminance in a user-defined region of interest in the image. For ease of reporting, the measured value is multiplied by 100 to arrive at a whole number scale (e.g., the baseline measurement of a gloss display with no sparkle would read 0.030, but is reported as 3.0). Other sources of high frequency luminance variation (both from the display backlight and moire with the camera) are not perfectly filtered out, and thus gloss displays with no observable sparkle do not read zero on the instrument: the minimum level is display dependent and is typically between 2 and 4. A sparkle level of less than 5 is deemed acceptable, from 5 to 6 is deemed marginal, and higher than 6 is deemed not acceptable.

Haze and Clarity

Haze and clarity are measured with a BYK Gardner Haze-gard (BYK-Gardner USA, Columbia, Md.). A clarity less than 95 is marginal for anti-glare properties. A clarity less than 90 is acceptable for anti-glare properties.

Examples 1-5

These five examples were run with the same dry thickness and similar haze. The formulation of the coating in each example is indicated in Table 1 and properties of the resultant coating are shown in Table 2.

As the formulation density decreased, sparkle degraded with both 3 and 5 micron particles. The higher the solution density and viscosity the higher the concentration of particles remained at the surface.

TABLE 1

Coating Formulation

| Material (wt % or wt ratio) | Example | | | | |
|---|---|---|---|---|---|
| | 1 | 2 | 3 | 4 | 5 |
| A | 10.62 | 14.64 | 23.88 | 10.38 | 13.95 |
| B | 3.54 | 4.88 | 7.96 | 3.46 | 4.65 |
| C | 3.54 | 4.88 | 7.96 | 3.46 | 4.65 |
| D | .90 | 1.24 | 2.03 | 0.88 | 1.19 |
| E | .02 | 0.02 | 0.02 | 0.02 | 0.02 |
| F | 21.49 | 31.63 | 54.1 | 22.25 | 32.68 |
| I | 0.78 | 2.07 | 4.14 | 0 | 0 |
| H | 0 | 0 | 0 | 1.84 | 4.14 |
| K | 59.0 | 40.64 | 0 | 57.71 | 38.72 |
| C:(A + B) | 1:0.25 | 1:0.25 | 1:0.25 | 1:0.25 | 1:0.25 |
| A:B | 3:1 | 3:1 | 3:1 | 3:1 | 3:1 |

TABLE 2

Coating Results

| Example | Forming Body Diameter (microns) | Density | Viscosity (cP) | Td (microns) | Haze | Clarity | Sparkle |
|---|---|---|---|---|---|---|---|
| 1 | 5 | 1.11 | 550 | 5 | 10.6 | 89.0 | 4.4 |
| 2 | 5 | 1.06 | 1330 | 5 | 9.5 | 73.3 | 5.6 |
| 3 | 5 | 1.00 | 600 | 5 | 4.2 | 81.6 | 8.6 |
| 4 | 3 | 1.11 | 575 | 5 | 15.8 | 87.1 | 3.6 |
| 5 | 3 | 1.06 | 1230 | 5 | 12.1 | 80.3 | 5.2 |

Td is dry thickness of coating.

Examples 6-11

These three sets of examples were made to show the effect upon sparkle from the particle size. The sets varied thickness and haze. The formulation of the coating in each example is indicated in Table 3 and properties of the resultant coating are shown in Table 4.

Sparkle was degraded as particle size increased. The haze, density, and thickness were similar within each set of three examples.

TABLE 3

Coating Formulations

| Material (wt % or wt ratio) | Examples | | | | | |
|---|---|---|---|---|---|---|
| | 6 | 7 | 8 | 9 | 10 | 11 |
| A | 10.17 | 9.95 | 10.6 | 10.63 | 10.27 | 9.95 |
| B | 3.39 | 3.32 | 3.53 | 3.54 | 3.42 | 3.32 |
| C | 3.39 | 3.32 | 3.53 | 3.54 | 3.42 | 3.32 |
| D | 0.86 | 0.85 | 0.90 | 0.90 | 0.87 | 0.85 |
| E | 0.02 | 0.02 | 0.02 | 0.02 | 0.02 | 0.02 |
| F | 22.91 | 23.56 | 21.59 | 21.50 | 22.6 | 23.56 |
| G | 0 | 0 | 0 | 0 | 0 | 3.68 |
| H | 0 | 0 | 0.92 | 0 | 2.30 | 0 |
| I | 2.76 | 0 | 0 | 0.78 | 0 | 0 |
| J | 0 | 3.68 | 0 | 0 | 0 | 0 |
| K | 56.50 | 55.30 | 58.91 | 59.09 | 57.1 | 55.30 |
| C:(A + B) | 1:0.25 | 1:0.25 | 1:0.25 | 1:0.25 | 1:0.25 | 1:0.25 |
| A:B | 3:1 | 3:1 | 3:1 | 3:1 | 3:1 | 3:1 |

TABLE 4

Coating Results

| Example | Forming Body Diameter (microns) | Density | Viscosity (cP) | Td (microns) | Haze | Clarity | Sparkle |
|---|---|---|---|---|---|---|---|
| 6 | 5 | 1.11 | 530 | 6 | 34.2 | 64.2 | 3.8 |
| 7 | 8 | 1.11 | 560 | 6 | 35.9 | 65.8 | 4.8 |
| 8 | 3 | 1.11 | 550 | 5 | 7.6 | 93.8 | 3.7 |
| 9 | 5 | 1.11 | 550 | 5 | 10.6 | 89.0 | 4.4 |
| 10 | 3 | 1.11 | 435 | 3 | 26.0 | 85.6 | 3.4 |
| 11 | 1.5 | 1.11 | 560 | 3 | 20.8 | 92.7 | 2.8 |

Td is dry thickness of coating.

Examples 12-24

These three sets of examples were made to show the effect upon sparkle from dry thickness. One set of 5 micron particles with a low particle concentration (#12) in the solution and one with a high level (#13) were used. A third and fourth set are for 3 and 1.5 micron particles, respectively. The formulation of the coating in each example is indicated in Table 5 and properties of the resultant coating are shown in Table 6.

Sparkle was degraded as dry thickness increased for all sets of examples. The haze, density, and particle size were similar within each set of three examples.

TABLE 5

Coating Formulations - wt % of indicated component

| Material | Wt % or Weight Ratio in Example | | | |
|---|---|---|---|---|
| | 12 | 13 | 14 | 15 |
| A | 10.63 | 10.05 | 10.38 | 12.5 |
| B | 3.54 | 3.35 | 3.46 | 4.17 |
| C | 3.54 | 3.35 | 3.46 | 4.17 |
| D | 0.90 | 0.86 | 0.88 | 1.06 |
| E | 0.02 | 0.02 | 0.02 | 0.02 |
| F | 21.49 | 23.24 | 22.25 | 41.69 |
| G | 0 | 0 | 0 | 8.60 |
| H | 0 | 0 | 1.84 | 0 |
| I | 0.78 | 3.22 | 0 | 0 |
| K | 59.1 | 55.91 | 57.71 | 27.79 |
| C:(A + B) | 1:0.25 | 1:0.25 | 1:0.25 | 1:0.25 |
| A:B | 3:1 | 3:1 | 3:1 | 3:1 |

TABLE 6

Coating Results

| Example | Forming Body Diameter (microns) | Density | Viscosity (cP) | Td (microns) | Haze | Clarity | Sparkle |
|---|---|---|---|---|---|---|---|
| 12 | 5 | 1.11 | 550 | 8 | 5.8 | 84 | 5.5 |
| 13 | 5 | 1.11 | 550 | 7 | 7.3 | 85 | 5.1 |
| 14 | 5 | 1.11 | 550 | 6 | 8.5 | 87 | 4.7 |
| 15 | 5 | 1.11 | 550 | 5 | 10.6 | 89 | 4.4 |
| 16 | 5 | 1.11 | 680 | 9 | 24 | 56 | 5.1 |

TABLE 6-continued

Coating Results

| Example | Forming Body Diameter (microns) | Density | Viscosity (cP) | Td (microns) | Haze | Clarity | Sparkle |
|---|---|---|---|---|---|---|---|
| 17 | 5 | 1.11 | 680 | 8 | 26.3 | 52 | 4.6 |
| 18 | 5 | 1.11 | 680 | 7 | 29 | 49 | 3.8 |
| 19 | 3 | 1.11 | 575 | 7 | 11.7 | 88 | 4.6 |
| 20 | 3 | 1.11 | 575 | 6 | 12.4 | 88 | 4.3 |
| 21 | 3 | 1.11 | 575 | 5 | 15.8 | 87 | 3.6 |
| 22 | 1.5 | 1.04 | 830 | 8 | 19.6 | 50 | 7.1 |
| 23 | 1.5 | 1.04 | 830 | 7 | 22 | 51 | 6.5 |
| 24 | 1.5 | 1.04 | 830 | 6 | 23.5 | 51 | 5.5 |

Examples 25-29

These two sets of examples were made to show the effect upon sparkle from the addition of a second layer under the layer with particulates. The lower layer was the same formulation without particulates. The total dry thickness of the coatings were all 7 microns. The formulation of the coating in each example is indicated in Table 7 and properties of the resultant coating are shown in Table 8.

This data showed that a lower sparkle can be achieved with a thinner particulate thickness. The thicker layers may be important when increased hardness of the dried and cured layers is desired.

TABLE 7

Coating Formulations

| | Wt % or Weight Ratio in Example | | |
|---|---|---|---|
| Material | 16 | 17 | 18 |
| A | 10.38 | 10.8 | 10.27 |
| B | 3.46 | 3.6 | 3.42 |
| C | 3.46 | 3.6 | 3.42 |
| D | 0.88 | 0.92 | 0.87 |
| E | 0.02 | 0.02 | 0.02 |
| F | 22.26 | 20.92 | 22.6 |
| I | 1.84 | 0 | 2.30 |
| K | 57.70 | 60.11 | 57.10 |
| C:(A + B) | 1:0.25 | 1:0.25 | 1:0.25 |
| A:B | 3:1 | 3:1 | 3:1 |

TABLE 8

Coating Results

| Example | Forming Body Diameter (microns) | Density | Viscosity (cP) | Td (microns) | TdNP (microns) | Haze | Clarity | Sparkle |
|---|---|---|---|---|---|---|---|---|
| 25 | 5 | 1.11 | 490 | 7 | 0 | 17.4 | 69 | 5.0 |
| 26 | 5 | 1.11 | 480 | 5 | 2 | 17.5 | 72 | 5.2 |
| 27 | 5 | 1.11 | 480 | 4 | 3 | 14.3 | 79 | 4.9 |
| 28 | 5 | 1.11 | 480 | 3 | 4 | 12.5 | 85 | 4.7 |
| 29 | 5 | 1.11 | 480 | 2 | 5 | 10.7 | 92 | 4.1 |

FIGS. 6-11 are scanning electron microscope images of select matte coats from the Examples as follows:

| FIG. | Example | Description of View (Magnification) |
|---|---|---|
| 6 | 1 | Plan view of first major surface from 25° tilt (250X) |
| 7 | 1 | Cross section of first layer (1,000X) |
| 8 | 2 | Plan view of first major surface from 25° tilt (250X) |
| 9 | 2 | Cross section of first layer (1,000X) |
| 10 | 3 | Plan view of first major surface from 25° tilt (250X) |
| 11 | 3 | Cross section of first layer (1,000X) |

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for making a low sparkle matte coat comprising the steps of:
   preparing a forming composition comprising a film-forming curable mixture and a plurality of forming bodies, wherein the film-forming curable mixture has a viscosity of at least about 75 cps and density of at least about 0.95 and the forming bodies have a density of at least about 1.1, an index of refraction ($n_b$), and an average major dimension;
   depositing the forming composition into a coating having a major surface; then
   curing the curable mixture of the coating such that the curable mixture polymerizes and shrinks to yield a polymeric matrix having a plurality of protuberances on the major surface thereof corresponding to forming bodies entrained within the polymeric matrix.

2. The method of claim 1 wherein the forming composition has a viscosity of from about 75 to about 3,000 cps when deposited into coating form.

3. The method of claim 1 wherein the forming composition has a density of about 0.95 or more when deposited into coating form.

4. The method of claim 1 wherein the forming bodies have an index of refraction ($n_b$) of from about 1.35 to about 2.2.

5. The method of claim 1 wherein the film-forming curable mixture comprises one or more reactive polymers selected from the group consisting of thermosetting and thermoplastic polymers.

6. The method of claim 1 wherein the film-forming curable mixture comprises at least one of cellulose acetate butyrate and ethoxylated trimethylolpropane triacrylate.

7. The method of claim 1 wherein the film-forming curable mixture further comprises nanoparticles.

8. The method of claim 1 wherein the first layer has a thickness of about 10 microns or less.

9. The method of claim 1 wherein the thickness of the film-like deposit is about 1.5 times the average major dimension of the forming bodies.

10. The method of claim 1 wherein the average major dimension of the forming bodies is from about 0.8 to about 10 microns.

* * * * *